US007257333B2

(12) United States Patent
Rosenwald et al.

(10) Patent No.: US 7,257,333 B2
(45) Date of Patent: Aug. 14, 2007

(54) DYNAMIC CONTROL OF PLANCK RADIATION IN PHOTONIC CRYSTALS

(75) Inventors: Ross D Rosenwald, Tucson, AZ (US); Nitesh N. Shah, Tucson, AZ (US); Delmar L. Barker, Tucson, AZ (US); William R. Owens, Tucson, AZ (US); Hao Xin, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 226 days.

(21) Appl. No.: 11/030,621

(22) Filed: Jan. 6, 2005

(65) Prior Publication Data

US 2006/0147213 A1     Jul. 6, 2006

(51) Int. Cl.
*H04B 10/04* (2006.01)
(52) U.S. Cl. .................. 398/201; 398/182; 359/326
(58) Field of Classification Search ........ 398/182–201; 359/326
See application file for complete search history.

(56) References Cited

U.S. PATENT DOCUMENTS

| 6,744,552 | B2* | 6/2004 | Scalora et al. ............. 359/326 |
| 6,809,856 | B2* | 10/2004 | Reed et al. ................. 359/326 |
| 7,079,308 | B2 | 7/2006 | Reed et al. |
| 7,116,458 | B2 | 10/2006 | Reed et al. |
| 2002/0191905 | A1 | 12/2002 | Prather |
| 2005/0231796 | A1 | 10/2005 | Reed et al. |
| 2005/0259936 | A1 | 11/2005 | Karalis et al. |

FOREIGN PATENT DOCUMENTS

| WO | WO 03/087926 | 10/2003 |
| WO | WO 2004/049764 | 6/2004 |

OTHER PUBLICATIONS

C. Lopéz, "Materials Aspects of Photonic Crystals," Advanced Materials 15, 1679 (2003).
Zhi-Yuan Li, Phys. Rev. B 66, R241103 (2002).
S-Y. Lin, et al. Phys. Rev. B. 62, R2243 (2000).

(Continued)

*Primary Examiner*—Agustin Bello
(74) *Attorney, Agent, or Firm*—Noblitt & Gilmore, LLC (57) ABSTRACT

A band gap discontinuity is propagated across a Photonic Crystal (PC) to capture thermal energy in a region near the primary emission wavelength of the Planck spectral distribution and transfer that energy to a different spectral region where it is emitted. To extend the range of frequency shifting beyond the width of a single band gap, the intrinsic control parameters (e.g., lattice geometry factors, scattering element geometric factors, and variations in the index of refraction) are spatially varied across the PC to form a band gap gradient. Propagation of the band gap discontinuity, starting in the infrared wavelength region where the thermally generated electromagnetic energy is concentrated and propagating towards the long wavelength region, locally captures the thermal electromagnetic radiation, shifts it downwards in frequency, and pushes the lower-frequency thermal electromagnetic radiation on to the next region. The same principles apply to shift the frequency to shorter wavelengths. A PC-based power combining and waveguide structure can be constructed in the same or a surrounding structure to combine and guide the shifted radiation to an antenna or exit aperture.

25 Claims, 8 Drawing Sheets

OTHER PUBLICATIONS

E. J. Reed et al., Physical Review Letters 90, 203904 (2003a).
E. J. Reed et al., Physical Review Letters 91, 133901 (2003b).
Lu et al., IEEE Journal of Quantum Electronics 38, 481 (2002).
Iida et al., CLEO-QELS 2003 Conference Paper CMI2 (2003).
Weng W. Chow, "Theory of Emission from an Active Photonic Lattice," Physical Review A 73, 013821 (2006), pp. 1-9.
Kady et al., "Emission from an Active Photonic Crystal," Physical Review B 72 195110 (2005), pp. 1-5.

* cited by examiner

DYNAMIC CONTROL OF PLANCK RADIATION IN PHOTONIC CRYSTALS

CROSS-REFERENCE TO RELATED APPLICATIONS

This application claims benefit of priority under 35 U.S.C. 120 to U.S. application Ser. No. 10/960,679 entitled "Thermally Powered Terahertz Radiation Source Using Photonic Crystals" and filed on Oct. 7, 2004, the entire contents of which are incorporated by reference.

BACKGROUND OF THE INVENTION

1. Field of the Invention

This invention relates to the use of Photonic Crystals as a source of electromagnetic radiation at THz or other frequencies, and more specifically to dynamically propagating a band gap discontinuity through a Photonic Crystal to modify the spectral distribution of thermal electromagnetic radiation.

2. Description of the Related Art

Figures 1, 2:
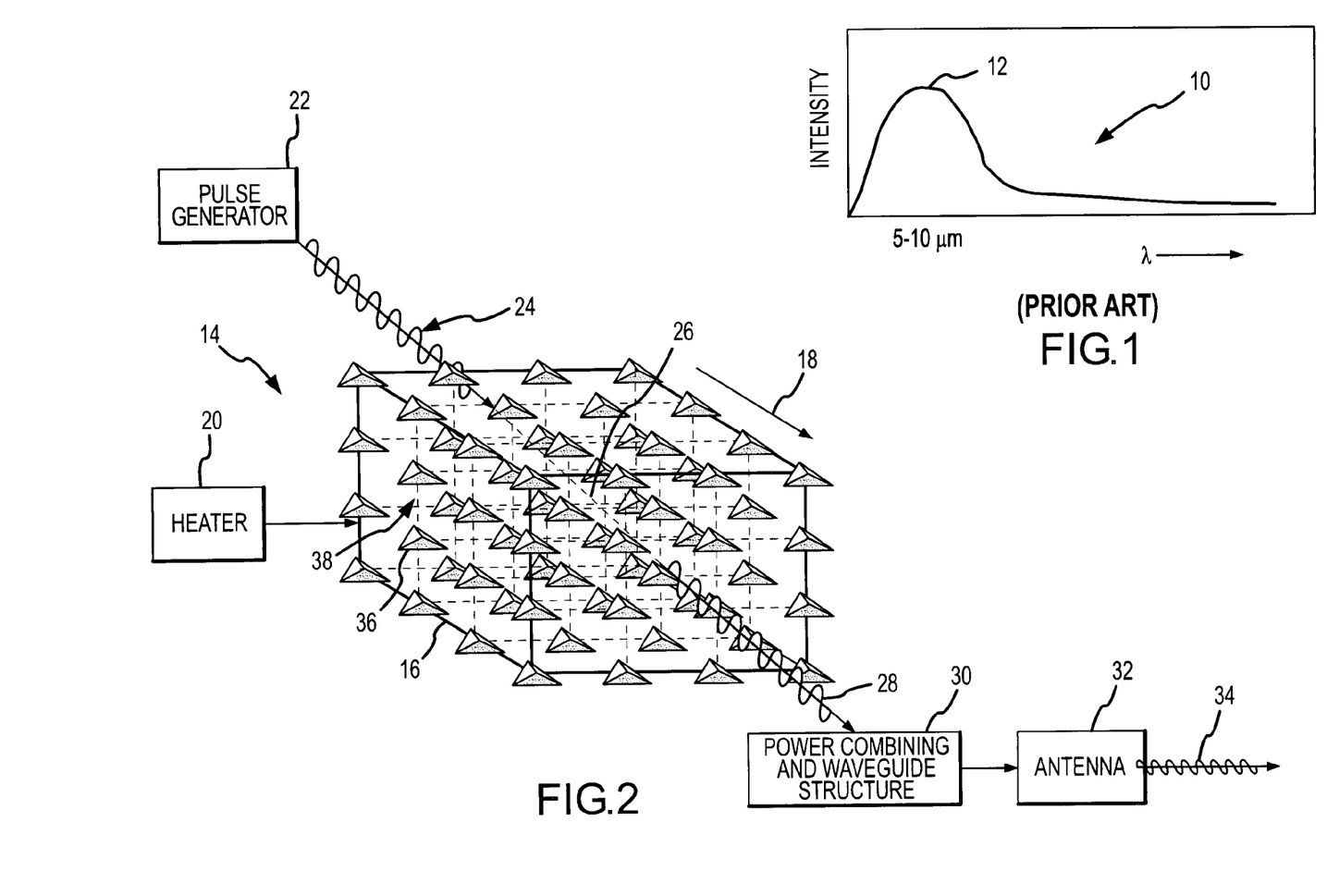
FIG. 1, as described above, is a plot of a typical Planck spectral distribution from a blackbody object at a given temperature.
FIG. 2 is a diagram of a radiation source in which a band gap discontinuity propagates through a 3D PC to modify its Planck spectral distribution.

At quite modest temperatures, small objects possess significant free energy, which is emitted in the form of thermal electromagnetic radiation across a broad spectral band, including visible, infrared (IR), THz, etc. For a perfect blackbody emitter, the thermal electromagnetic radiation follows the Planck spectral distribution 10 shown in FIG. 1. The blackbody emitter has a primary emission wavelength (peak) 12 in the IR band around 5-10 µm, depending upon temperature. Common materials can have more complex emission spectra, but always maintain the Planck distribution as an upper limit to emission peaks rather than being distributed evenly across all frequency bands.

A Photonic Crystal (PC) structure contains a periodic high-contrast modulation of the local index of refraction (or dielectric constant, for non-magnetic materials) in one, two or three dimensions. The underlying materials, processing, fabrication and tuning mechanisms are well developed (see for example C. López, Advanced Materials 15, 1679 (2003)). Any two substances having sufficient contrast between their respective indices of refraction can be placed in a stable periodic arrangement with a particular geometry, spacing and shapes of the constituent substances to create a photonic band gap (PBG) for a particular range of photon wavelengths. Electromagnetic radiation propagating in such a structure will undergo multiple Bragg scattering from the lattice array. Under certain conditions, the multiply-scattered waves interfere destructively, resulting in minimal transmission over a broad range of wavelengths, which is termed the "band gap" (a term borrowed from semiconductor physics). The PBG is said to be complete when transmission is blocked for all polarizations and all angles of incidence within the wavelength band. The PC material can be actively controlled to open or close the PBG, or shift the edges of the band gap. This can be accomplished by modulating the index of refraction contrast, changing the geometric arrangement or altering the symmetry of the scattering objects. If the periodic lattice is strained in such a manner as to maintain its periodicity but change its lattice spacing, the deformation simply alters the symmetry parameters thereby shifting the edges of the band gap. Or, if the periodic lattice is strained in such a manner to create aperiodic lattice deformation, the band gap can be switched off.

An object's Planck spectral distribution may be modified when the object is a PC. The existence of a PBG can be used to suppress radiated power in certain wavebands and enhance radiated power in other wavebands (Z. Li, Physical Review B 66, R241103 (2002), and S. Lin et al., Physical Review B 62, R2243 (2000)). This effect is most obvious when the band gap is positioned around the main peak (e.g., 5-10 µm) of the Planck spectral distribution. A three-dimensional (3D) PC can induce strong redistribution of the photon Density of States (DOS) among different frequency bands to modify the thermal electromagnetic radiation. Li supra designed the DOS of a PC to provide orders-of-magnitude enhancement in the low-DOS band of the short-wavelength region. This leads to significantly enhanced emission of thermal electromagnetic radiation in the visible waveband (approximately 0.5 µm) for a modest cavity temperature.

E. J. Reed et al., Physical Review Letters 90, 203904 (2003a); E. J. Reed et al., Physical Review Letters 91, 133901 (2003b); and E. J. Reed et al. in U.S. Pat. No. 6,809,856 entitled "Shock-wave Modulation and Control of Electromagnetic Radiation" and issued on Oct. 26, 2004 describe a technique for frequency shifting (upward or downward) single-frequency electromagnetic radiation injected into the PC from an external single-frequency laser. Reed et al. consider a particular form of a temporally-varying PC by simulating the propagation of a lattice-distorting (or index-of-refraction-changing) pulse ("shock-wave") in a PC having a PBG. The incident light encounters the shock wave (i.e., the upshifted first band gap) moving in the opposite direction and is reflected backwards so that the light rides up on the shock wave and is pushed over the band gap to a higher frequency. In their implementation, the incident radiation was confined to the visual spectrum with frequency shifts limited to the width of the PC's first static band gap. In a later publication (Reed 2003b) they illustrate shifting frequencies downward by a compression induced wave in the dielectric constant of the material.

One of the major bottlenecks for the successful implementation of THz-frequency systems has been the limited output power of conventional THz sources. Most systems produce THz radiation via optical techniques, but those require massive lasers, complex optical networks and cooling systems. There are other reports on generating THz radiation using PC structures. Lu et al., IEEE Journal of Quantum Electronics 38, 481 (2002), discuss optical rectification in a nonlinear PC, requiring pump light and converting it to THz with an efficiency of approximately 1%. Iida et al., CLEO-QELS 2003 Conference Paper CMI2 (2003), place a photomixing antenna in a high-Q defect cavity in a PC.

None of these approaches offers a compact, reliable and low-cost radiation source, nor the bandwidth and frequency agility to source electromagnetic energy at THz and other frequencies.

SUMMARY OF THE INVENTION

The present invention provides a method of designing and dynamically controlling a PC to modify the Planck spectral distribution of thermal electromagnetic radiation, and more specifically to shift the primary emission wavelength and reshape the distribution to concentrate more energy around the shifted peak. This approach uses the internal heat energy of a PC to configure a compact, reliable and low-cost source with the bandwidth and frequency agility to source electromagnetic radiation at THz and other frequencies. These sources will have great impact in many applications such as biological and/or chemical sensing, biomedical and other imaging systems, spectroscopy, unmanned aerial vehicle systems, and automated traffic products.

Shifting and reshaping the distribution is accomplished by propagating a band gap discontinuity across a PC to capture thermal energy in a region near the primary emission wavelength of the Planck spectral distribution and transfer that energy to a different spectral region where it is emitted. The intensity of thermal radiation can be enhanced by simply heating the PC. The PC includes intrinsic control parameters (e.g., lattice geometry factors, scattering element geometric factors, and variations in the index of refraction) that create band gaps across the PC. The application of a "pulse" acts on the control parameters to create the propagating band gap discontinuity.

For example, a mechanical pulse compresses the lattice constant to create a shockwave through the PC. Alternately, a magnetic pulse would vary the optical index of refraction in a high magnetic permeability material to create the band gap discontinuity. Other mechanisms for changing the control parameters in a "pulsed" manner include short range changes in the symmetry of the lattice (phase changes) or in the material dielectric constant by compression or rarification or electric fields.

To extend the range of frequency shifting beyond the width of a single band gap, the control parameters are spatially varied across the PC to form a band gap gradient that gradually changes as one moves along an axis of the PC. A band gap discontinuity propagating along the axis, starting in the short IR wavelength region where the thermally generated electromagnetic energy is concentrated and propagating towards the long wavelength region, will locally capture the thermal electromagnetic radiation, shift it downwards in frequency, and push the lower-frequency thermal electromagnetic radiation on to the next region. The same principles apply to shift the frequency to shorter wavelengths.

A PC-based power combining and waveguide structure can be constructed in the same or a surrounding structure to combine and guide the shifted radiation to an antenna or exit aperture. In one embodiment, a number of defect cavities designed to resonate at the shifted peak are spaced across the PC in the last gradient step to collect energy in a narrow band around the peak. Once the energy level has built up, the next pulse causes the cavities to couple and release energy to a waveguide and out to the antenna. The source can be configured to either release some energy with each subsequent pulse or to release all of the stored energy in a large pulse. Various geometries and architectures can be used to implement the power combining and waveguide structure. For example, additional rows of defect cavities can be used to capture any residual energy that was not captured by the first row. Alternately, a number of rows can be formed in respective gradient steps and "tapped" to output energy at different discrete wavelengths.

These and other features and advantages of the invention will be apparent to those skilled in the art from the following detailed description of preferred embodiments, taken together with the accompanying drawings, in which:

DETAILED DESCRIPTION OF THE INVENTION

The present invention describes how to design and dynamically control a PC to modify the Planck spectral distribution of thermal electromagnetic radiation, and more specifically to shift the primary emission wavelength and reshape the distribution to concentrate more thermal energy around the shifted peak. This approach is useful to configure a compact, reliable and low-cost source with the bandwidth and frequency agility to supply electromagnetic energy at THz and other frequencies. These sources will have great impact in many applications, e.g., biological and/or chemical sensing, biomedical and other imaging systems, spectroscopy, unmanned aerial vehicle systems, training devices and automated traffic products.

Li supra and Lin supra teach designing the DOS to suppress radiation emissions in the IR region and significantly enhance thermal radiation emissions in the visible waveband (approximately 0.5 µm). These principles were extended to shift the peak radiation to longer wavelengths (e.g., THz region) in a copending U.S. patent application entitled "Thermally Powered Terahertz Radiation Source Using Photonic Crystals" and filed on Oct. 7, 2004. Reed et al. supra teach that the application of a shock wave to a PC in which single-frequency electromagnetic radiation is injected in an opposing direction from an external source such as a laser can shift the frequency (upward or downward) by a predetermined amount no greater than the width of the PC's band gap.

We have applied and extended these principles to design and dynamically control a PC to effectively shift and reshape the Planck spectral distribution of thermal electromagnetic radiation. These emissions can be enhanced using a very inexpensive heat source to heat the PC. The result is a compact, reliable and low cost source of radiation with bandwidth and frequency agility far exceeding the capabilities of the designs of Li supra and Lin supra. Furthermore, we have generalized the dynamic control of the Plank spectral distribution to the "propagation of a band gap discontinuity" across the PC. This is accomplished by applying pulses that act on the intrinsic control parameters (e.g., lattice geometry factors, scattering element geometric factors, and variations in the index of refraction) to create the band gap discontinuity that propagates across the PC. The creation of a "shock wave" is only one specific embodiment. We have expanded the available bandwidth and provided the frequency agility necessary to source radiation in the THz region and other frequencies by creating a band gap "gradient" in the PC so that the propagating band gap discontinuity locally captures thermal electromagnetic radiation, shifts it downwards (upwards) in frequency, and pushes the lower-frequency (higher-frequency) thermal electromagnetic radiation on to the next region. A spatially-varying PC designed with a band gap gradient can also be used in combination with an external source of electromagnetic radiation. We also provide a PC-based power combining and waveguide structure to combine and guide narrow-band shifted pulsed radiation to an antenna.

As shown in FIGS. 2 through 6, a source 14 of thermal electromagnetic radiation includes a 3D PC 16 constructed with a band gap gradient 18. Depending upon the requirements of a particular source or application, a heater 20 may be used to heat the PC to enhance the intensity of its thermal electromagnetic radiation. A pulse generator 22 applies a sequence of pulses 24 to the PC 16 to create a band gap discontinuity that propagates along an axis 26 of the PC. Starting in the IR wavelength region where the thermally generated electromagnetic energy is concentrated and propagating towards the long wavelength region, the propagating band gap discontinuity 27 locally captures the thermal electromagnetic radiation, shifts it downwards in frequency, and pushes the lower-frequency thermal electromagnetic radiation on to the next region where the process is repeated. The cumulative effect is to shift the primary emission wavelength and reshape the Planck distribution to concentrate more energy near the peak of radiation 28. The same principles apply to shift the frequency to shorter wavelengths except that the first band gap is preferably positioned in the long IR region past the Planck peak to capture more thermal energy. A PC-based power combining and waveguide structure 30 can be constructed in the same or a surrounding PC structure to combine and guide the shifted radiation 28 to an antenna 32 where it is emitted as a beam 34 of pulsed thermal electromagnetic radiation. The radiation core may be implemented without this structure.

Figures 3A, 3B, 4:
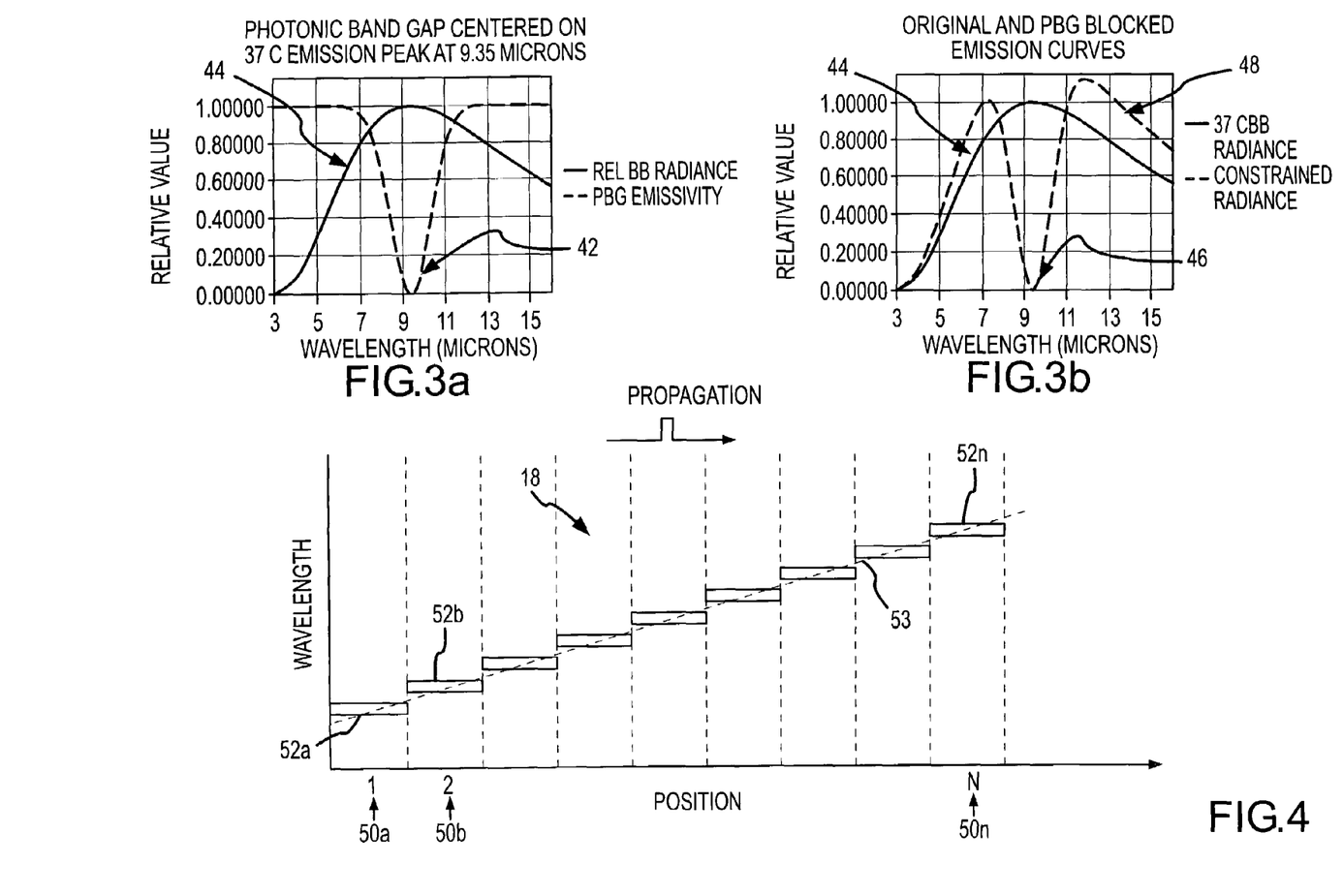
FIGS. 3a and 3b are plots of a PBG for a first gradient step and the underlying Planck distribution and the modified distribution.
FIG. 4 is a band gap diagram for a gradient PC.

The PC 16 includes scattering elements 36 in a periodic lattice 38 with refractive index contrast between the scattering elements and the fill region 40. Intrinsic control parameters including lattice geometry factors (symmetry and spacing constants), scattering element geometric factors (symmetry, orientation and size constants), and variations in the index of refraction (lattice fill and scattering element) are designed to create the band gaps in the PC 16. As shown in FIGS. 3a and 3b, a band gap 42 positioned near the peak of the underlying Planck spectral distribution 44 suppresses thermal emissions in the IR band 46 and enhances emissions at longer wavelengths of modified spectral distribution 48.

As shown in FIG. 4, in one embodiment band gap gradient 18 exhibits a piece-wise step continuous construction. The PC is divided into N spatial regions 50a, 50b, ... 50n in which the control parameters are designed to create distinct band gaps 52a, 52b, ... 52n. This can be done, for example, by spatially varying a standard "woodpile" Si structure to change the lattice constant. Alternately, a continuous band gap gradient 53 can be constructed using a sedimentation opal structure process, in which Si or $SiO_2$ spheres having continuously increasing radii are deposited sequentially. In general, any one of the many known PC structures can be used.

To shift thermal energy from the IR band to longer wavelengths (e.g., the THz region) in a piece-wise step construction, the first band gap 52a is positioned near the peak of the underlying Planck distribution, preferably to the left of the peak towards the short IR region to capture the most thermal energy. The $2^{nd}$ through $N^{th}$ band gaps 52b ... 52n are positioned at longer and longer wavelengths thereby creating a band gap gradient 18. The width of each region and each band gap will depend on the number of regions, the desired frequency shift, and the strength of the applied pulses. For example, if each band gap 52a ... 52n has a fractional band gap width (band gap frequency width divided by band gap center frequency) of 25%, then approximately N=15 steps are required to shift the frequency from the infrared region (26 THz-52 THz) down to 1 THz.

Figures 5, 6:
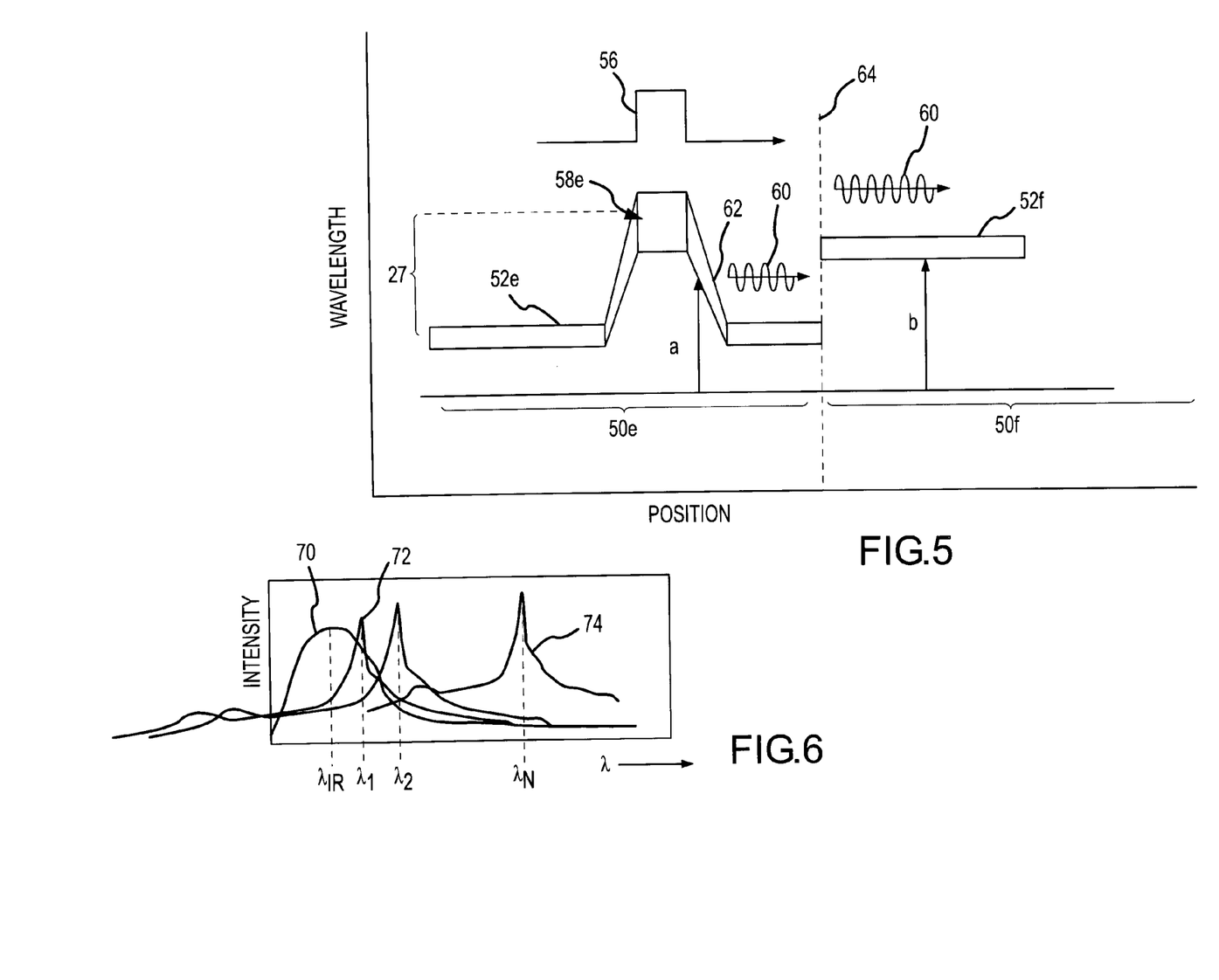
FIG. 5 is a band gap diagram illustrating the propagation of the band gap discontinuity through the PC.
FIG. 6 is a plot of the shifted Planck spectral distribution in accordance with the invention.

As shown in FIG. 5, the application of a pulse 56 traveling across the PC acts on the control parameters to shift the band gap 52e within the pulse to a band gap 58e and to create the propagating band gap discontinuity 27. In this example, a mechanical pulse 56 compresses the lattice (spacing) constant to shift the band gap up and create a shockwave (also 27) that travels through the PC. Alternately, a magnetic pulse would vary the index of refraction to create a magnetic disturbance. Other lattice-morphing and/or index-of-refraction-changing combinations, as noted previously, are suitable. To create downward shifts in frequency, the band gap discontinuity wave should result in an increase in dielectric constant. The concept of a band gap discontinuity propagating through a band gap gradient structure can be used to shift frequencies either up or down depending upon the details of the band gap discontinuity.

As band gap 58e propagates through the PC, thermal energy 60 emitted at a wavelength corresponding to approximately the top of band gap 52e is captured by the front of shockwave 27 and pushed forward. When the shock front 62 reaches the interface 64 between regions 50e and 50f and band gap level "a" at the shock front at least matches band gap level "b" in the next region 52f, the thermal energy 60 is transferred to the next region and shifted to a longer wavelength corresponding to approximately the top of band gap 52f. By definition, the thermal energy cannot exist in a band gap. Therefore, as the shockwave propagates through the PC, the thermal energy is pushed up the "steps" to longer and longer wavelengths.

As shown in FIG. 6, the propagation of a band gap discontinuity across a PC designed with a band gap gradient modifies the Planck spectral distribution 70 of thermal electromagnetic radiation. More specifically, energy in the IR band near the peak of the Planck spectrum is captured and transferred to successively longer wavelength bands. This process not only shifts the primary emission wavelength but also reshapes the distribution by concentrating more thermal energy near the peak. As illustrated in FIG. 6, positioning the first band gap near (preferably below) the peak of the Planck distribution transfers a considerable amount of thermal energy to a longer wavelength $\lambda_1$ so that spectral distribution 72 has a narrow peak at $\lambda_1$. At each successive step, the wavelength is shifted up, the intensity of the peak increases, the peak narrows and the tails are suppressed, producing a modified spectrum 74 at the last step. Although thermal energy is accumulated at each step, most of the energy is captured in the first step or couple of steps. Therefore it is very important to optimize the design and placement of the first PBG. In each successive step, the band gap is positioned further and further away from the peak of the underlying Planck distribution whose intensity diminishes rapidly at higher wavelengths.

Figure 7A:
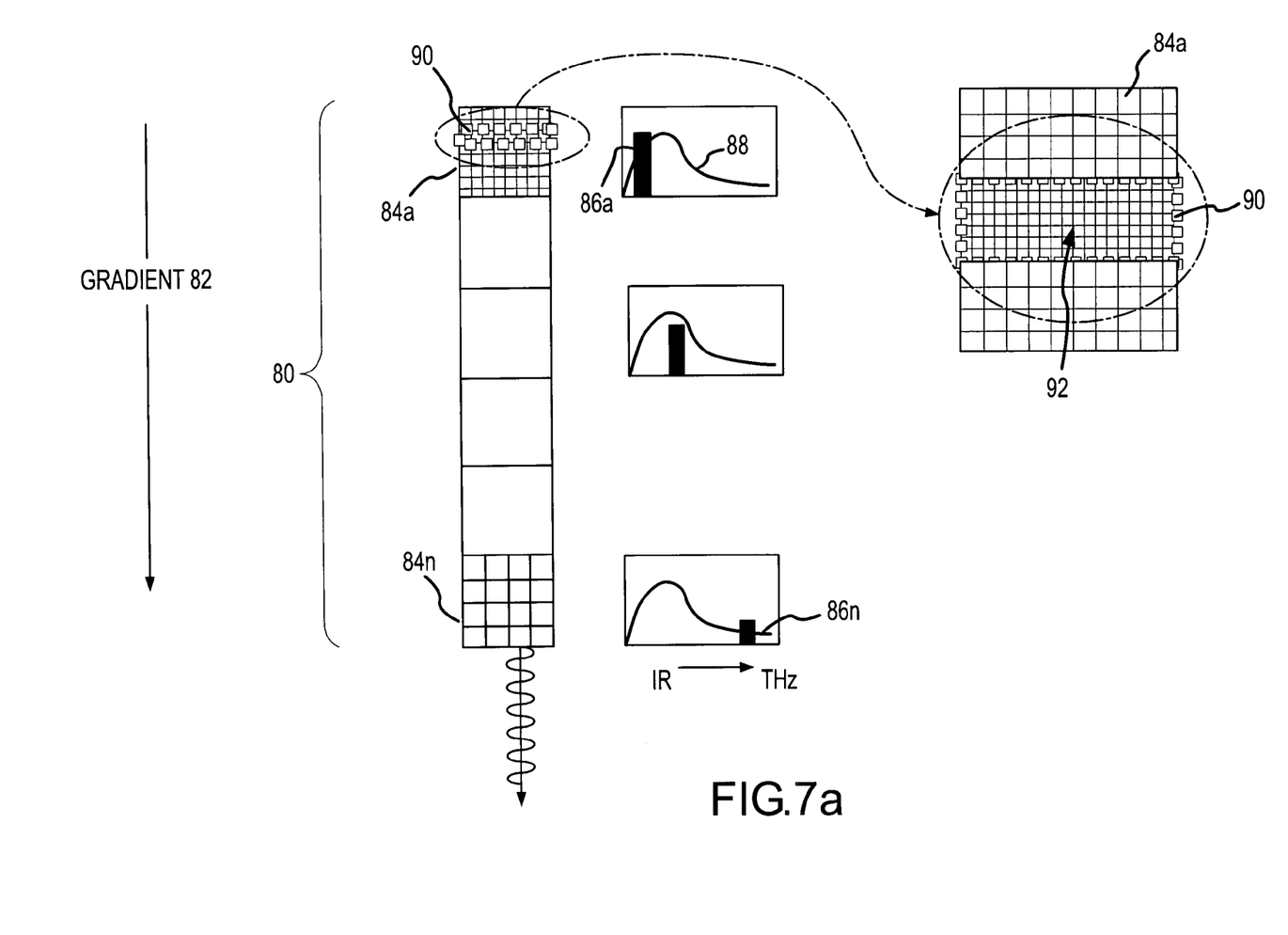
FIGS. 7a and 7b are diagrams illustrating the propagation of a shockwave through a piece-wise step continuous and a continuous PC, respectively.

As illustrated in FIG. 7a, an exemplary embodiment includes a PC 80 in which the lattice constant (spacing between scattering elements) is designed and spatially varied to create a piece-wise step continuous band gap gradient 82. The first region 84a of the PC has a relatively small lattice constant that corresponds to a PBG 86a position near (preferably below) the peak of the Planck distribution 88. Conversely, the $N^{th}$ region 84n of the PC has a relatively large lattice constant that corresponds to a PBG 86n positioned considerably above the peak of the Planck distribution 88.

Figure 7B:
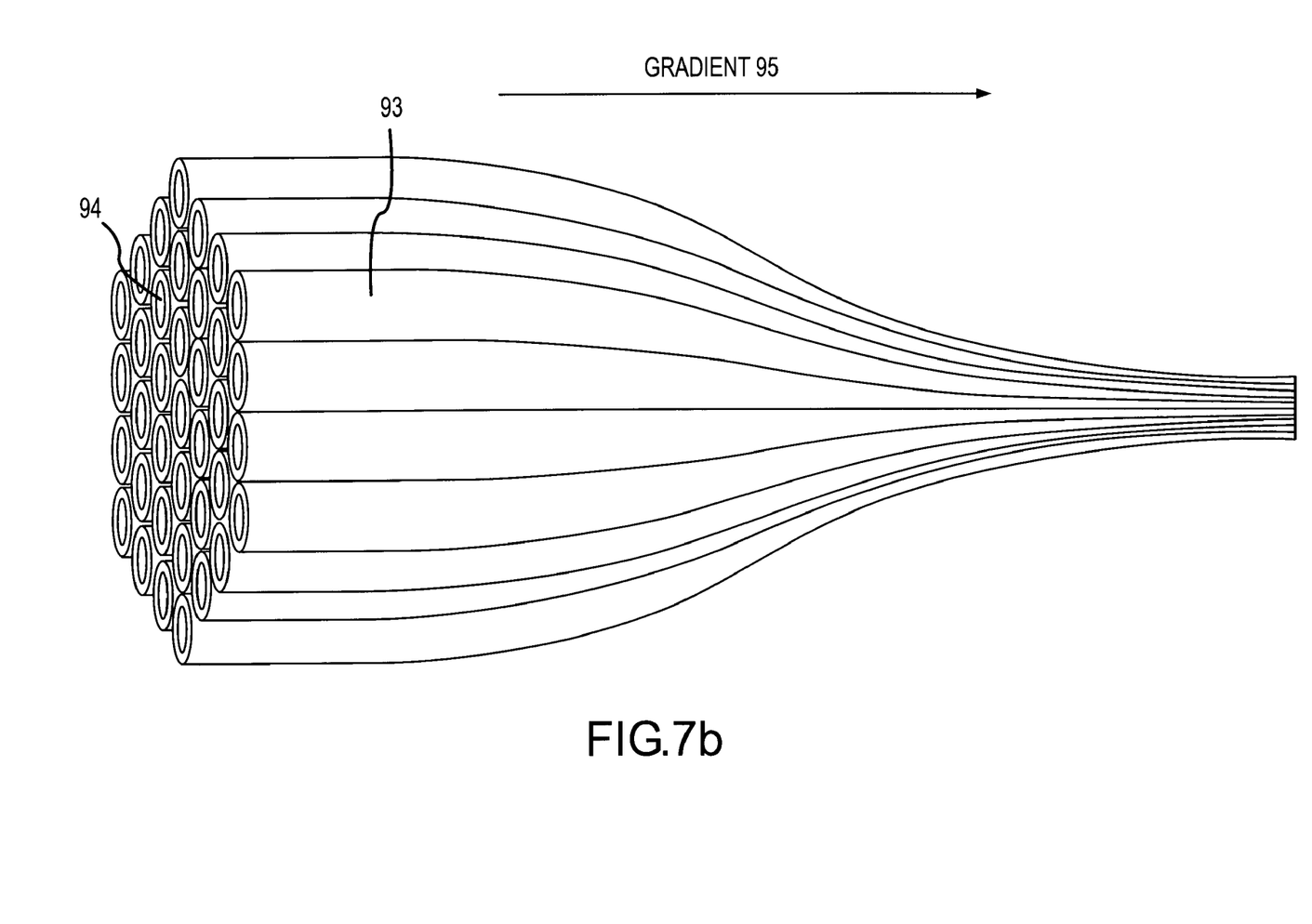

The application of a mechanical pulse to the PC creates a shock wave 90 that compresses the lattice constant 92 and shifts the dielectric constant thereby changing the refractive index. The change in refractive index outweighs the compression of the lattice constant so the net effect is to shift the band gap to a longer wavelength. Thermal electromagnetic radiation is trapped within the moving shock wave/PC interface as its wavelength is increased from the IR region to the THz region. As illustrated in FIG. 7b, another embodiment includes a PC 93 in which the lattice constant (spacing between scattering elements 94) is designed and spatially varied to create a continuous band gap gradient 95.

The radiation core is suitably surrounded by or appended to a PC-based wave guiding and power-combining structure 30 such that the radiated energy will be efficiently collected and directed to an output antenna(s) 32. The PC layer is suitably designed to have a band gap in the desired frequency band to achieve efficient coupling of radiation from the core to the output antenna(s). Various geometries and architectures can be used, depending on the application.

Figure 8:
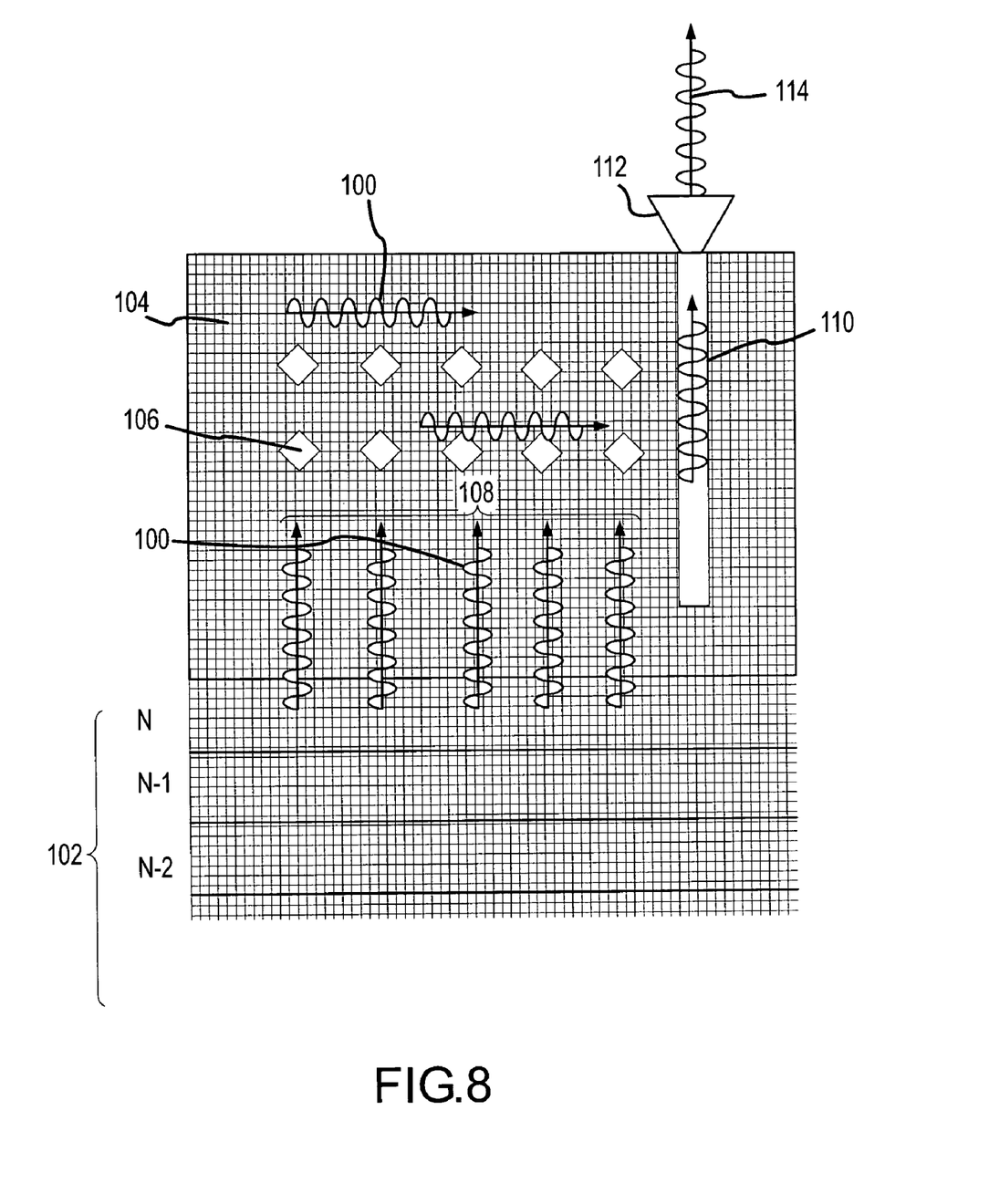
FIG. 8 is a diagram of a power combining and waveguide structure.

As shown in FIG. 8, thermal electromagnetic radiation 100 (upshifted and concentrated) emitted by the radiation core 102 is coupled to a PC layer 104 in which a plurality of defect cavities 106 designed to resonate at the shifted peak are spaced across the PC orthogonal to the direction of propagation of the shockwave 108 to collect energy in a narrow band around the peak. Once the energy level has built up, every $m^{th}$ pulse, where m is determined by the Q of the cavities, causes the cavities 106 to couple and release energy to a waveguide 110 and out to an antenna 112 that emits a beam 114 of pulsed radiation. The source can be configured to either release some or all of the stored energy every $m^{th}$ pulse. Additional rows of defect cavities 106 can be used to capture any residual energy that was not captured by the first row.

Figure 9:
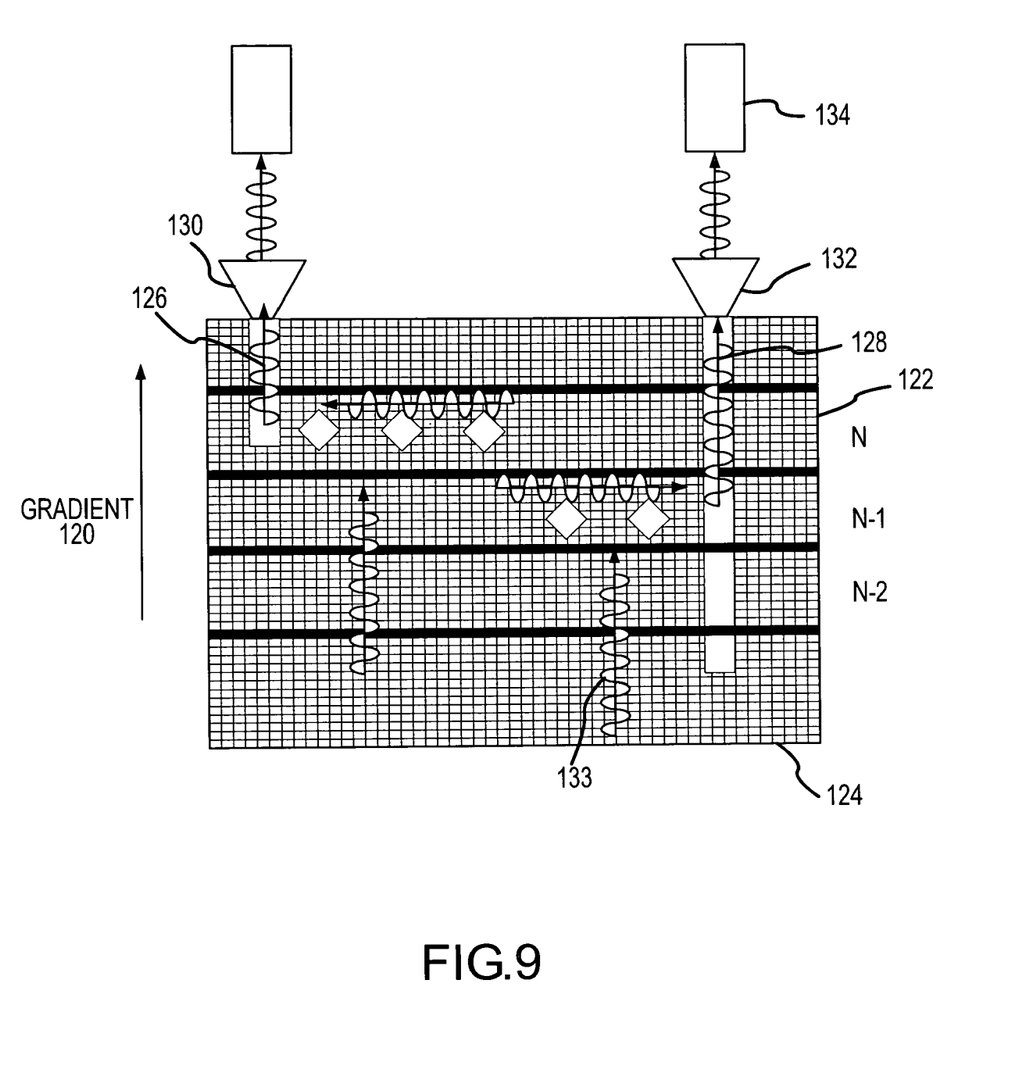
FIG. 9 is a diagram of an alternate power combining and waveguide structure.

As shown in FIG. 9, rows of defect cavities 120 may be formed in respective regions 122 N, N-1, . . . of the spatially varying PC 124 in the radiation core itself and coupled to respective waveguides 126, 128 and out to antennas 130, 132 to extract a plurality of discrete frequencies from thermal electromagnetic radiation 133. In another alternate embodiment, an integrating cavity 134 can be coupled to the antennas to integrate the beam and provide continuous thermal electromagnetic radiation.

Figure 10:
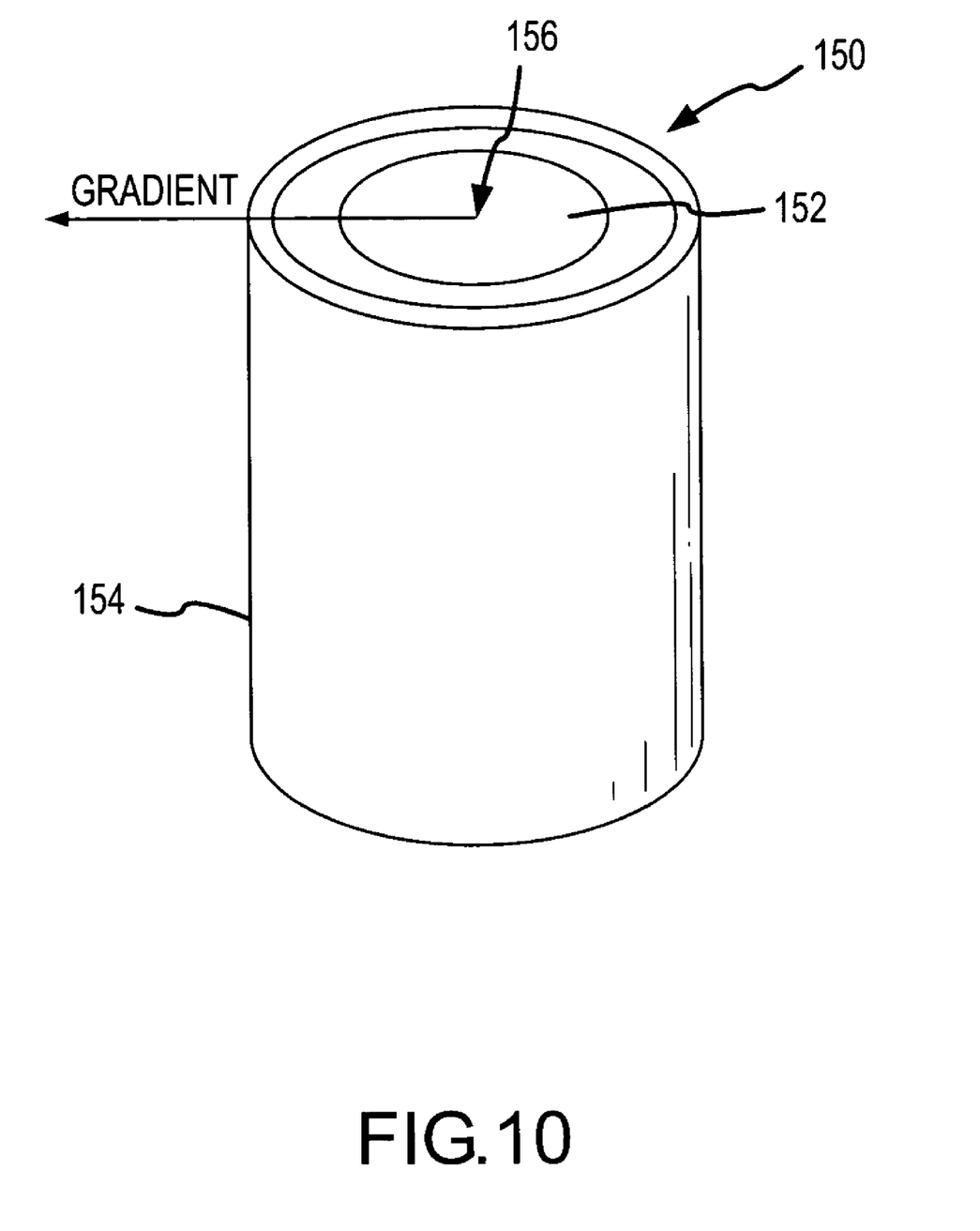
FIG. 10 is a diagram of a cylindrical PC in which the band gap discontinuity propagates from the inner surface to the outer surface of the structure.

Besides the linear geometry discussed above, a cylindrical configuration 150 as shown in FIG. 10 is possible, with the band gap discontinuity propagating from an inner surface 152 to an outer surface 154 of the structure. In this case, the pulses can be generated by heating a wire 156 positioned along the axis of the cylinder. The radiation is emitted from the entire outer surface 154 without resonant defect cavities to collect and redirect the radiation. Many other possible geometric arrangements exist for the band gap gradient including, for example, a spherical arrangement.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of modifying the spectral distribution of internally generated thermal electromagnetic radiation emitted by a photonic crystal (PC), comprising;
    modifying intrinsic control parameters in an input spatial region of the PC to provide a first band gap near a primary emission wavelength in the IR region of the spectral distribution;
    modifying intrinsic control parameters in an output spatial region of the PC to provide a last band gap shifted away from said primary emission wavelength; and
    propagating a band gap discontinuity across the PC to locally capture thermal energy from the first band gap input spatial region, shift its wavelength to at least match the last band gap, and transfer that wavelength-shifted energy to the output spatial region where the energy is emitted.

2. The method of claim 1, further comprising heating the PC to enhance the internally generated thermal electromagnetic radiation.

3. The method of claim 1, wherein said method comprises applying a pulse to the PC that acts on the control parameters to create the propagating band gap discontinuity.

4. The method of claim 1, wherein said intrinsic control parameter is a dielectric constant determining the index of refraction, said method comprises applying a perturbation to the PC that compresses the lattice and changes the dielectric constant in the appropriate direction to create the propagating band gap discontinuity.

5. The method of claim 1, further comprising collecting the thermal electromagnetic radiation at the peak of the modified spectral distribution using a field of resonant defect cavities and then collectively dumping the radiation stored therein into a waveguide.

6. The method of claim 1, further comprising:
    modifying the intrinsic control parameters in a plurality of intermediate spatial regions between the input and output spatial regions of the PC to form a plurality of different intermediate band gaps between the first and last band gaps, said first, intermediate and last band gaps defining a band gap gradient having a spectral range beyond the width of any one of said band gaps,
    wherein said propagating band gap discontinuity locally captures thermal energy from the first band gap in the first spatial region at one end of the band gap gradient, shifts its wavelength to at least match the first intermediate hand gap in the first intermediate spatial region, transfers the wavelength-shifted energy to first intermediate spatial region and so forth for all said intermediate band gaps until the wavelength-shifted thermal energy is emitted at the other end of the band gap gradient.

7. The method of claim 6, wherein the intrinsic control parameters are modified across the input, said intermediate and output spatial regions so that the band gap gradient is continuous.

8. The method of claim 6, wherein the intrinsic control parameters are modified across the input, intermediate and output spatial regions so that the band gap gradient is piece-wise step continuous.

9. The method of claim 6, wherein said band gap gradient shifts the primary emission wavelength of the spectral distribution from the IR band to peak in the THz band.

10. The method of claim 6, wherein propagation of the band gap discontinuity across the band gap gradient shifts the primary emission wavelength and reshapes the spectral distribution by concentrating more thermal energy near the shifted primary emission wavelength.

11. The radiation source of claim 10, wherein said band gap gradient shifts the primary emission wavelength of the spectral distribution from the IR region to the THz region.

12. A method of modifying the spectral distribution of electromagnetic radiation in a photonic crystal (PC), comprising:
forming a PC having spatially-varying intrinsic control parameters that create a series of at least three different band gaps in respective spatial regions including a first band gap positioned near a primary emission wavelength of the spectral distribution of the electromagnetic energy, a second shifted band gap, and an Nth shifted band gap positioned progressively further away from said primary emission wavelength that together form a band gap gradient; and
propagating a band gap discontinuity through the PC in the direction of the gradient from the $1^{st}$ to the Nth spatial region to locally capture the radiation energy from each spectral region, shift it in wavelength to at least match the next band gap, and push the wavelength shifted radiation on to the next spatial region until the wavelength-shifted thermal energy is emitted in the Nth spatial region at the other end of the band gap gradient.

13. The method of claim 12, wherein the PC emits internally generated thermal electromagnetic radiation, said first band gap being positioned near the IR peak of the Planck spectral distribution of the thermal electromagnetic energy.

14. A radiation source, comprising:
a photonic crystal (PC) structure that emits thermal electromagnetic energy in a Planck spectral distribution, said PC having spatially-varying intrinsic control parameters that create a first band gap near the IR band of the Planck spectral distribution in an input spatial region and a last band gap in a different spectral region in an output spatial region; and
a source that applies a pulse to the PC to act on the intrinsic control parameters to propagate a band gap discontinuity through the PC to locally capture thermal energy from the first band gap in the input spatial region, shift its wavelength to at least match the last band gap and transfer that wavelength-shifted energy to the output spatial to modify the Planck spectral distribution emitted by the PC.

15. The radiation source of claim 14, further comprising a heater that heats the PC to enhance the internally generated thermal electromagnetic radiation.

16. The radiation source of claim 14, wherein the intrinsic control parameters create a plurality of different intermediate band gaps in a respective intermediate spatial regions between said input and output spatial regions, said propagating band gap discontinuity locally capturing the thermal energy in from said first and said intermediate band gaps in the respective spatial regions, shifting it in wavelength to at least match the next band gap, and pushing the wavelength shifted radiation on to the next spatial region where the radiation is emitted in the last spatial region.

17. The radiation source of claim 16, wherein each successive spatial region shifts the thermal energy upwards in wavelength.

18. The radiation source of claim 14, further comprising a plurality of defect cavities to collect the wavelength-shifted thermal energy and dump the energy into a waveguide that directs it to an antenna.

19. The radiation source of claim 18, wherein the defect cavities are local resonators tuned to the peak of the modified spectral distribution.

20. A radiation source, comprising:
a spatially-varying photonic crystal (PC) having a first band gap positioned near the peak of a spectral distribution of electromagnetic radiation in a first spatial region of the PC, a second shifted band gap in a second spatial region, and an Nth shifted band gap in an Nth spatial region, said N band gaps defining a band gap gradient with wavelengths progressively further away from said peak and having a spectral range greater than the width of any one of said band gaps;
a source of electromagnetic radiation having said spectral distribution; and
a source that propagates a band gap discontinuity through the PC to capture the radiation energy from each band gap of the corresponding spatial region, shift it in wavelength to at least match the band gap of the next spatial region, and push the wavelength shifted radiation on to the next spatial region thereby modifying the spectral distribution of the electromagnetic radiation.

21. The radiation source of claim 20 wherein the source of electromagnetic radiation is said PC that emits internally generated thermal electromagnetic radiation, said first band gap being positioned near the IR peak of the Planck spectral distribution of the thermal electromagnetic energy.

22. A radiation source, comprising:
a photonic crystal (PC) layer that emits thermal electromagnetic radiation having a spectral distribution, said PC layer having spatially-varying intrinsic control parameters that create a band cap gradient having one end near the primary emission wavelength in the IR region of the spectral distribution and a spectral range greater than the width of any single band gap;
a source that propagates a band gap discontinuity across the PC to capture thermal radiation energy near the primary emission wavelength and shift it in wavelength to the other end of the band gap gradient to reshape the spectral distribution of the emitted thermal electromagnetic radiation;
a waveguide in the PC layer coupled to an output port; and
a field of defect cavities in the PC layer that collect wavelength-shifted radiation energy at the other end of the band gap gradient and collectively dump the electromagnetic radiation stored therein into the waveguide, which guides the radiation to the output port.

23. The radiation source of claim 22, wherein the defect cavities are narrowband resonators that are tuned to the primary emission wavelength of the wavelength-shifted spectral distribution.

24. The radiation source of claim 23, wherein the band gap discontinuity propagates as a series of pulses that couple the defect cavities causing them to dump the radiation into the waveguide.

25. A radiation source, comprising:
a photonic crystal (PC) structure that emits internally generated thermal electromagnetic energy in a Planck spectral distribution, said PC having spatially-varying intrinsic control parameters that create a series of band gaps including a first band gap in a first spatial region at a wavelength positioned near the primary emission wavelength of the spectral distribution, a second shifted band gap in a second spatial region, a third shifted band gap in a third spatial region and an Nth shifted band gap in an Nth spatial region at wavelengths positioned progressively further away from said peak that together form a band gap gradient; and a source that applies a pulse to the PC to act on the intrinsic control parameters to propagate a band gap discontinuity through the PC in the direction of the gradient from the $1^{st}$ to the Nth spatial region to locally capture the radiation energy from each band gap of the corresponding spatial region, shift it in wavelength to at least match the next band gap, and push the wavelength shifted radiation on to the next spatial region thereby shifting and narrowing the peak of the spectral distribution from the IR band to another spectral band at the other end of the band gap gradient.

* * * * *